Dec. 17, 1963    F. REIFENHÄUSER    3,114,301
METHOD OF AND APPARATUS FOR THE CONTINUOUS
PRODUCTION OF TUBULAR CONTAINERS
Filed Oct. 20, 1958    3 Sheets-Sheet 1

INVENTOR
FRIEDRICH REIFENHÄUSER
BY Dobrick & Dobrick
ATTORNEYS

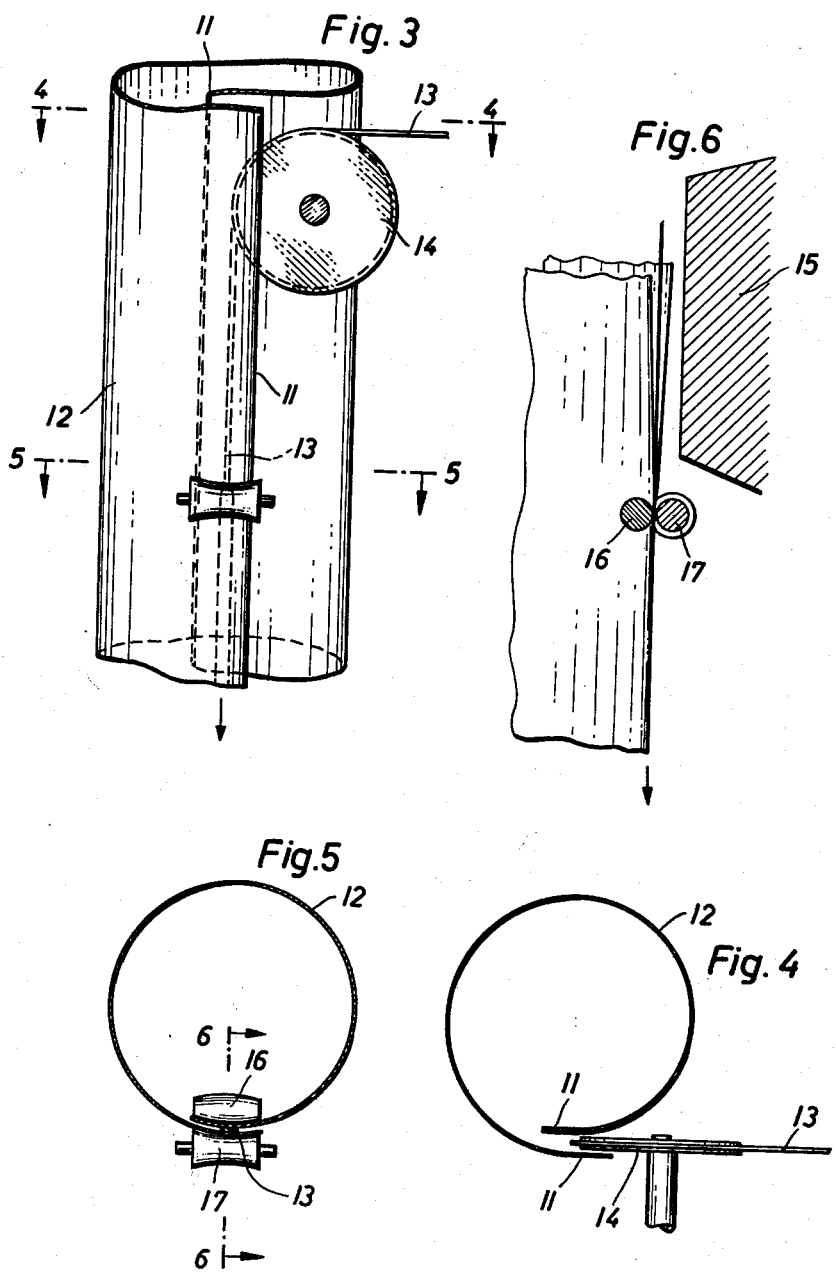

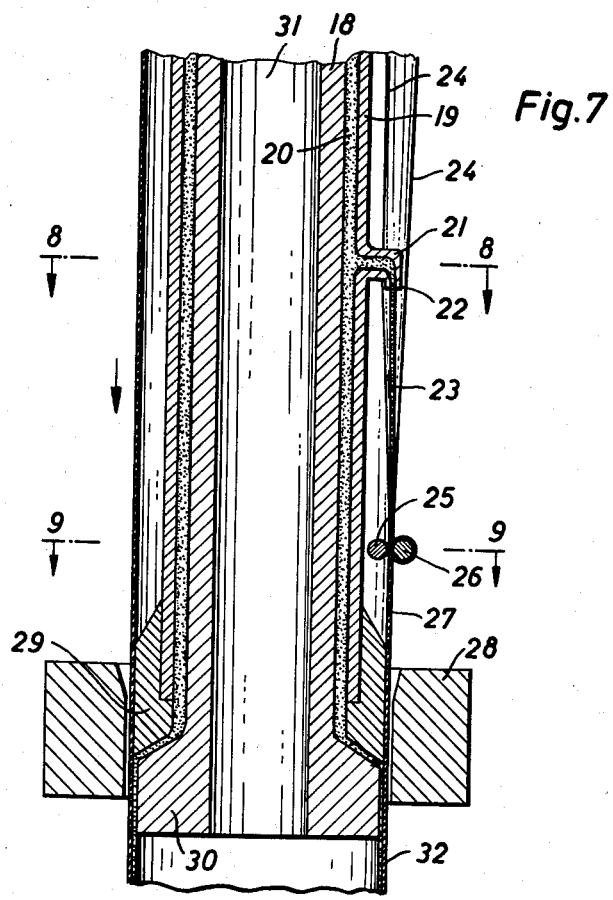
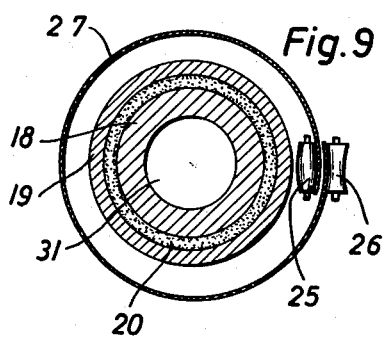
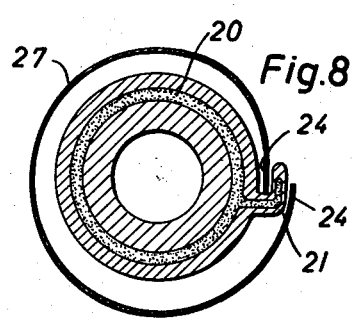

United States Patent Office 3,114,301
Patented Dec. 17, 1963

3,114,301
METHOD OF AND APPARATUS FOR THE CONTINUOUS PRODUCTION OF TUBULAR CONTAINERS
Friedrich Reifenhäuser, Troisdorf, Cologne, Germany, assignor to Reifenhäuser K.G., Troisdorf, Cologne, Germany
Filed Oct. 20, 1958, Ser. No. 768,239
3 Claims. (Cl. 93—77)

This invention relates to a method of and apparatus for the continuous production of tubular containers of board, paper or other materials, suitable for packing liquid, pulverulent or granular material, especially food, the said containers being laminated on the inside with a synthetic thermoplastic substance. The invention will be described in terms of a cylindrical container, it being recognized that other tubular forms may be produced.

The method according to the invention comprises feeding a strip or band of paper, paper-board or the like stock curled transversely to produce a cylindrical hollow body, to the annular gap or nozzle of the extrusion head of a thermoplastic extrusion machine; the cylindrical hollow body continuously embracing a flexible tube of thermoplastic substance emerging from the annular gap, said thermoplastic tube providing a sealing means on the interior of the cylindrical hollow body. For the production of tubular containers by this method in contrast to the otherwise conventional mode of operation, use must initially be made of a band from which is formed, only shortly before being fed to the annular nozzle, a cylindrical hollow body having a longitudinal opening, because if a previously prepared and circumferentially closed hollow cylindrical body is used it would not be possible to attach the extrusion nozzle to the machine in practical manner.

The said hollow body may, for example, be formed in such manner that the edges of the said strip are brought together for a butt joint with one another in the hollow cylinder. The edges are then secured by the same material as the applied tube of the thermoplastic substance. A considerably firmer connection is obtained if, in a development of the method according to the invention, the strip is curled together to such an extent in forming the cylindrical hollow body that the side edges overlap to a greater or lesser degree. Between the overlapping margins, a filament of thermoplastic material is constantly introduced before the entry of the hollow body into the said annular gap, and by the application of heat and pressure is welded to the overlapping portions to form a closed cylinder or tube. The filament can under these circumstances be heated in manner known per se by passing the lap joint embodying said filament close by a heater or by a radiant heating means or the like. The filament itself is fed from a storage roll or spool by way of a guide roller in such manner that it is laid into the center of the overlap region with the same feed rate as the stock for the cylindrical hollow body or the extruded synthetic plastic flexible tube. With this mode of operation the hollow body is therefore already closed along the longitudinal joint or seam before it enters the annular nozzle for the purposes of lamination.

A suitable apparatus for performing the method comprises an injection head of conventional construction in which, however, the central plastic feed passage discharges, at a suitable distance in front of the annular gap, through passages radially penetrating the injection head casing, into an annular space provided in said casing and opening laterally towards the surface, and in the region of which an outer annular body serving to support and guide the hollow body is disposed concentrically in such manner that with the injection head casing it de-limits an annular cylindrical gap corresponding to the wall thickness of the hollow body plus the thickness of the synthetic plastic flexible tube and from which gap the finished coated tubular body emerges in the direction of the extrusion head axis.

Instead of a synthetic plastic welding filament taken from a storage roll, in a modification of the principle of the invention the apparatus may advantageously be constituted in such manner that, in the region of the overlaps and above the annular nozzle, the casing of the injection head is provided with a laterally extending branch of the plastic feed passage terminating outside the said casing in a narrow extrusion nozzle. Through this branch a small part of the extrusion material is bled to emerge as a thin filament, which enters between the overlapping surfaces of the hollow body, two pressure rollers being provided between the outlet point of said filament and the entrance point of the hollow body into the annular nozzle, the welding of the filament, heated in suitable manner, to the side edges of the hollow body being effected between the said pressure rollers. In this case, for welding purposes use is made of the same material as that constituting the thermoplastic material, an appropriate filament being laterally bled off out of the extrusion head.

The apparatus is adapted advantageously to continuous packaging operations with complete exclusion of air, in which case according to the invention the mandrel of the extrusion head is provided with a central passage for the continuous feed of the material to be packed. The said material then comes into contact with this passage only, from which it passes directly and, if desired, continuously into the packing tube. Polyethylene or other known synthetic thermoplastic substances having the same properties are particularly suitable as materials for the interior sealing tube.

In order that the invention may clearly be understood and carried into effect the same will now be described with the aid of the accompanying diagrammatic drawings in which:

FIG. 3 is a view of the strip, formed to provide the tubular hollow body, before entering the region of the extrusion nozzle;

FIG. 4 is a plan view of the tubular hollow body shown in FIG. 3, showing further the relative disposition of the guide roller for feeding the welding filament between the overlapping edges;

FIG. 5 is a plan view of the hollow body according to FIG. 3, showing the overlapping edges as they are being secured together by the pressure rollers;

FIG. 6 is a fragmentary axial section through the hollow body, taken as indicated by line 6—6 in FIG. 5;

FIG. 7 is a longitudinal section through the lower part of an extrusion nozzle in which the injection passage is branched off laterally for the formation of the filament;

FIG. 8 is a cross-section on the line 8—8 in FIG. 7, and

FIG. 9 is a cross-section on the line 9—9 in FIG. 7.

Figure 1:
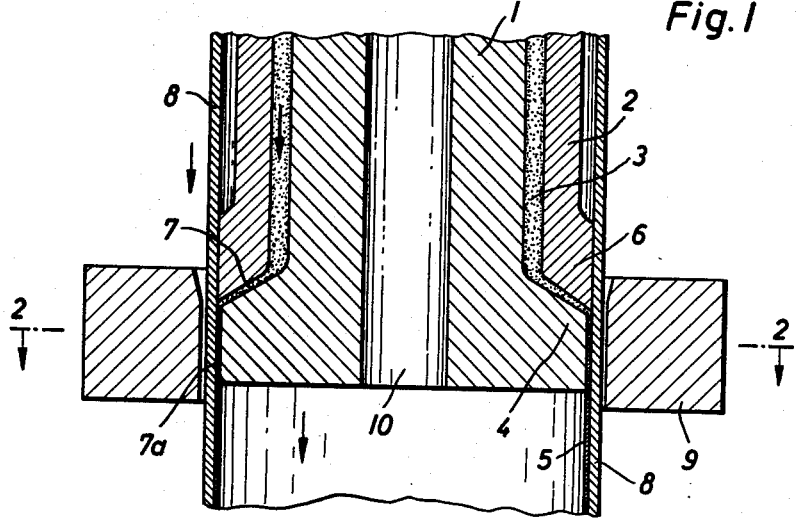
FIG. 1 is a fragmentary vertical or axial cross-section through the outlet of an extrusion head.
Figure 2:
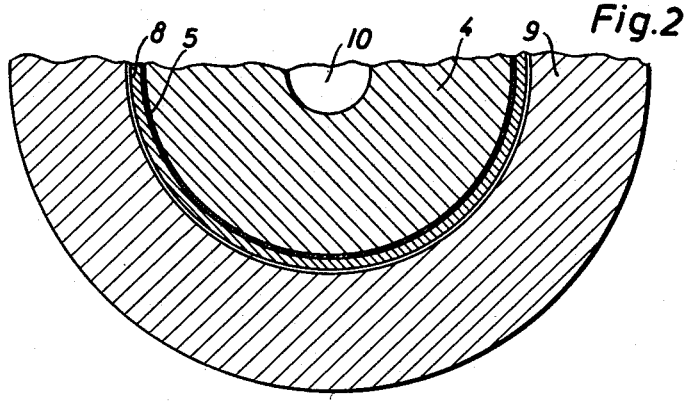
FIG. 2 is a transverse cross-section on the line 2—2 of FIG. 1.

The extrusion head (see FIG. 1) comprises the core 1 and the surrounding coaxially disposed cylindrical casing 2, which together with the core defines the annular interior passage 3 for the feed of the extruded plastic substance. At the point where the said passage leads into the outer surface of the extrusion head, the inner core is widened in the lower part 4 to a diameter equal to the outer diameter of the end of casing 2, diminished by twice the desired thickness of the extruded synthetic plastic flexible tube 5. In this region of the widened portion, which is defined by a slightly conical surface, the lower part 6 of the casing 2 is also made with a female conical end face in such manner that a correspondingly narrowed annular injection nozzle 7 is formed. From this nozzle the synthetic thermoplastic material laterally enters the annular cylindrical passage 7a, which is defined on the one hand by the external circumferential surface of the enlarged part 4 and on the other hand by moving inner wall surface of the actual packing tube or cover 8, which according to this invention is made from a strip of paper, paper-board, synthetic plastic or other suitable material, curled transversely into a generally tubular form with abutting edges longitudinally progressively (i.e., progressively down its length) as it is fed toward the nozzle by guide means (not shown) surrounding the casing 2. Such curling means for forming a strip of stock continuously into tubular form with a longitudinal joint or seam are well known in the paper and metal forming arts.

In this way, the extruded synthetic plastic, on emerging from the passage 7a, is applied in the still hot state to the moving tube 8, the latter being thus interiorly coated with the said synthetic plastic as an extruded internal tube. Since under these circumstances a considerable pressure has to be taken by the said tube 8, the latter is supported by an enclosing steel ring 9 disposed in the region of the annular gap 7a. After leaving the ring 9, the synthetic plastic coating on the inside of the cover 8 has hardened to such an extent that the material to be packed can already be introduced therein. This introduction takes place through a central bore 10 of the core 1 of the injection head.

In view of the required mechanical connection and support of this head on an extrusion machine, the packaging shell 8 cannot be supplied as a closed hollow body; on the contrary, a strip of packing material of suitable width is fed from a stock roll, curled into a tube and brought around the extrusion head, the inside diameter of which tube corresponds to the outside diameter of the thickened part 6 of said casing 2, so that the outer surface of this part serves as a guide for the sleeve.

It may be here noted in the drawings, that even apart from the inlet taper, for the sake of clarity, a marked clearance is shown between the exterior of the tube 8 and the inner surface of the die-like member 9; and so also in subsequent FIG. 7.

Since, however, from considerations of strength, closure of the tube is desired before it enters the injection nozzle, a modification according to FIGS. 3–6 is proposed in which the band has a width such that the side edges 11 of the sleeve 12 formed therefrom overlap. In the space between this overlap a filament 13 of weldable synthetic thermoplastic substance is now introduced by means of the guide roller 14; and after prior heating by the heater 15 (see FIG. 6), is spread between and welded to the overlapping margins of the sleeve material by passage of the overlapped joint region between the pressure rollers 16 and 17. In view of environmental structural limitations, the roller 16 obviously will have to be supported on a portion of the head casing reduced to accommodate the same.

However, instead of supplying a filament as described above, there may also be used an apparatus of the kind shown in FIGS. 7 to 9, in which the annular extrusion passage 20 formed between the bored or tubular core 18 and the casing 19 has a lateral branch 21 extending in the horizontal direction and having a narrow nozzle 22, from which the extruded substance is constantly bled to emerge in the form of a filament 23, entering the region of the two overlaps 24 of the partly formed tube 27. The position of said branch passage on the extrusion head casing and the amount of lateral extension is so selected that the filament 23 is introduced into the center region of the overlapped surfaces 24 to be welded together. Welding is then effected by means of the pressure rollers 25, 26 after prior heating of the said filament to welding temperature, by means located as in FIG. 6 for the previously described manner of carrying out the invention.

If desired, it is however also sufficient merely to bring these rollers 25, 26 (so also for 16, 17 of FIG. 3–6) to the appropriate welding temperature. Since this welding device is disposed above the extrusion passage, an already closed tube 27 is passed into the annular space delimited by the steel ring 28 and the extrusion head parts 29 and 30. Otherwise, the construction and operation is the same generally as that described in connection with FIG. 1. The material to be packed is fed to the already coated tube 32 in the same manner through the bore 31 of the part 18.

The tubular container may of course have a circular annular, oval, prismatic or any other desired cross-section, as finally determined by the shape of the opening of the elements 9 or 28 and of the parts 4, 6 or 29, 30 respectively cooperating therewith as a shaping die at the region of plastic extrusion and application.

Details of the extrusion apparatus, stock-feed guide rolls or other like guide means, funnel-like paper stock curling guide means about the extrusion head casing located between the filament inserting or laying device and the point of attachment of the head to the main part of the plastic extrusion machine may assume various forms and dispositions well known to the art, and hence are not set forth.

In the apparatus above described the "extrusion head," by which is intended the plastic material forming work head attached to the main structure of a synthetic plastic thermoplastic extrusion machine from which a thermoplastic material is supplied under pressure, requires of course, a sufficient length from its mounted end to the nozzle end to accommodate the strip curling means bringing the stock into tubular form thereabout; and the filament laying means where used, be it a guide roller or an auxiliary filament nozzle, along with the pressure rolls as well as the joint heater means if such is distinct from the pressure rolls.

It may also be noted that body tubing moving along or formed about a mandrel may be externally coated, by use of a nozzle of annular form surrounding the mandrel and producing in effect a plastic tube embracing the body tubing axially advanced therethrough, with of course the filament laying, joint heating and rolling means located in advance of the nozzle.

Where the material to be packaged is of such form as requires container end closures, and the goods to be packaged are not injected into the tubing as formed, the continuous length of laminated tubing emerging from the apparatus may be cut to desired lengths and thereafter capped and filled by various procedures and closure means as desired and well known to the art; and in similar manner particularly where goods are extruded into the container being formed, the filled tubing may be cut and capped. However the laminated tubing itself may be a sufficient container, without any firmly applied end caps or closures, for some substances to be packaged where such are in solid or semi-solid state at the point where the tubing and contents are cut up.

I claim:

1. Apparatus for manufacture of tubular containers suitable for packaging of semi-solid, liquid, powdered or granular substances from paper, chip-board or other like material, said containers having an interior seal of synthetic thermoplastic substance, said apparatus being adopted for use with a thermoplastic extrusion machine or the like, comprising: means including a mandrel-like member adapted to receive a tubular body advanced lengthwise thereon and formed of strip stock of said material and surrounding said mandrel with longitudinal margins of the strip brought into longitudinal overlapping relation for a longitudinal joint to be closed; a die-like member surrounding the first said member to form a gap therebetween to receive and externally support the tubular body passed therethrough; the first said member comprising an extrusion head of said machine having an internal channel for thermoplastic substance delivered from said machine and also having in the region of said gap and in communication with said channel a circumferentially continuous nozzle opening for extrusion of a thermoplastic substance as a continuous thin tube internally adherent to said body; the first said member being circumferentially relieved, to a depth corresponding substantially to the thickness desired in said tube, from the nozzle opening onward in the direction of advance of the tubular body; means for laying a continuous filament of said thermoplastic material longitudinally between the overlapped margins as the tubular body is advanced toward said gap; and means located between the first said means and said gap for applying heat and pressure to the overlapped region with enclosed filament to close and form a longitudinal joint therealong before application of said tube to said body; said filament laying means comprising a small outwardly projecting nozzle member on the first member communicating with said internal channel and having a small nozzle orifice bearing lateral extension thereon adapted to overhang the inner of the said overlapped margins, the nozzle orifice opening toward the direction of tubular body advance, whereby thermoplastic material may be bled from the said internal channel for extrusion as a filament between said margins.

2. Apparatus as described in claim 1 wherein a barrel-shaped or longitudinally convex roller and a cooperating longitudinally concave roller with axis transverse to the direction of tubular body advance form the means for applying pressure to the overlapped region, the convex and concave rollers respectively contacting the inner and outer surfaces of the tubular body and one roller being biased toward the other.

3. Apparatus as described in claim 2 having a source of heat for the overlapped regions disposed adjacent the said first member between the pressure applying rollers and the filament guide roller.

References Cited in the file of this patent

UNITED STATES PATENTS

| | | |
|---|---|---|
| 2,105,273 | Smith | Jan. 11, 1938 |
| 2,132,239 | Harrison | Oct. 4, 1938 |
| 2,257,823 | Stokes | Oct. 7, 1941 |
| 2,631,509 | Whytlaw | Mar. 17, 1953 |